Oct. 28, 1924.

W. B. BETTS 1,513,215

RECORDING AND WAGE COMPUTING CLOCK

Filed Sept. 15, 1923   6 Sheets-Sheet 1

INVENTOR.
W. Betts,
BY
Geo. P. Kimmel, ATTORNEY.

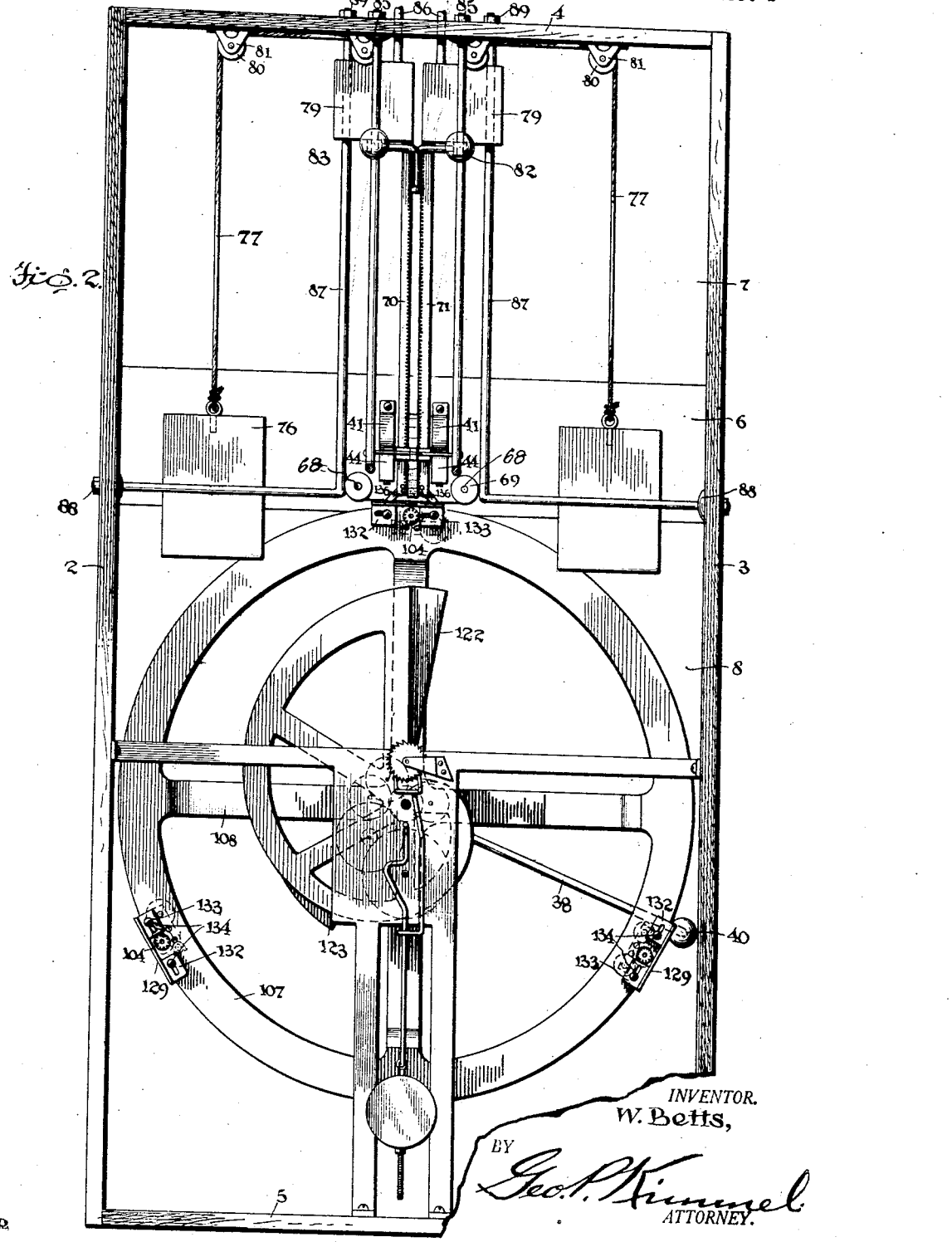

Oct. 28, 1924.  
W. B. BETTS  
1,513,215  
RECORDING AND WAGE COMPUTING CLOCK  
Filed Sept. 15, 1923 6 Sheets-Sheet 3
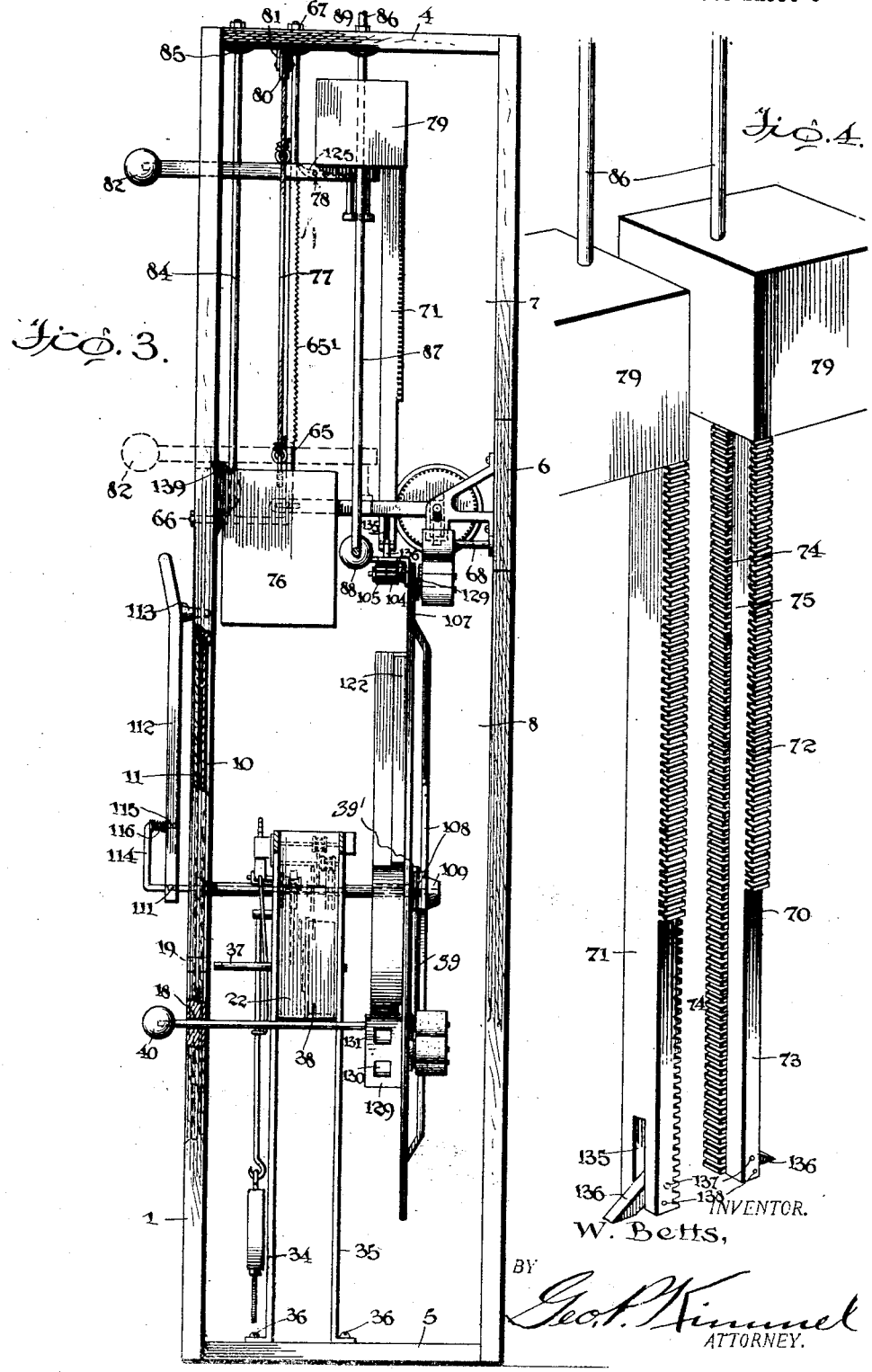
INVENTOR.  
W. Betts,  
BY  
Geo. F. Kimmel  
ATTORNEY.

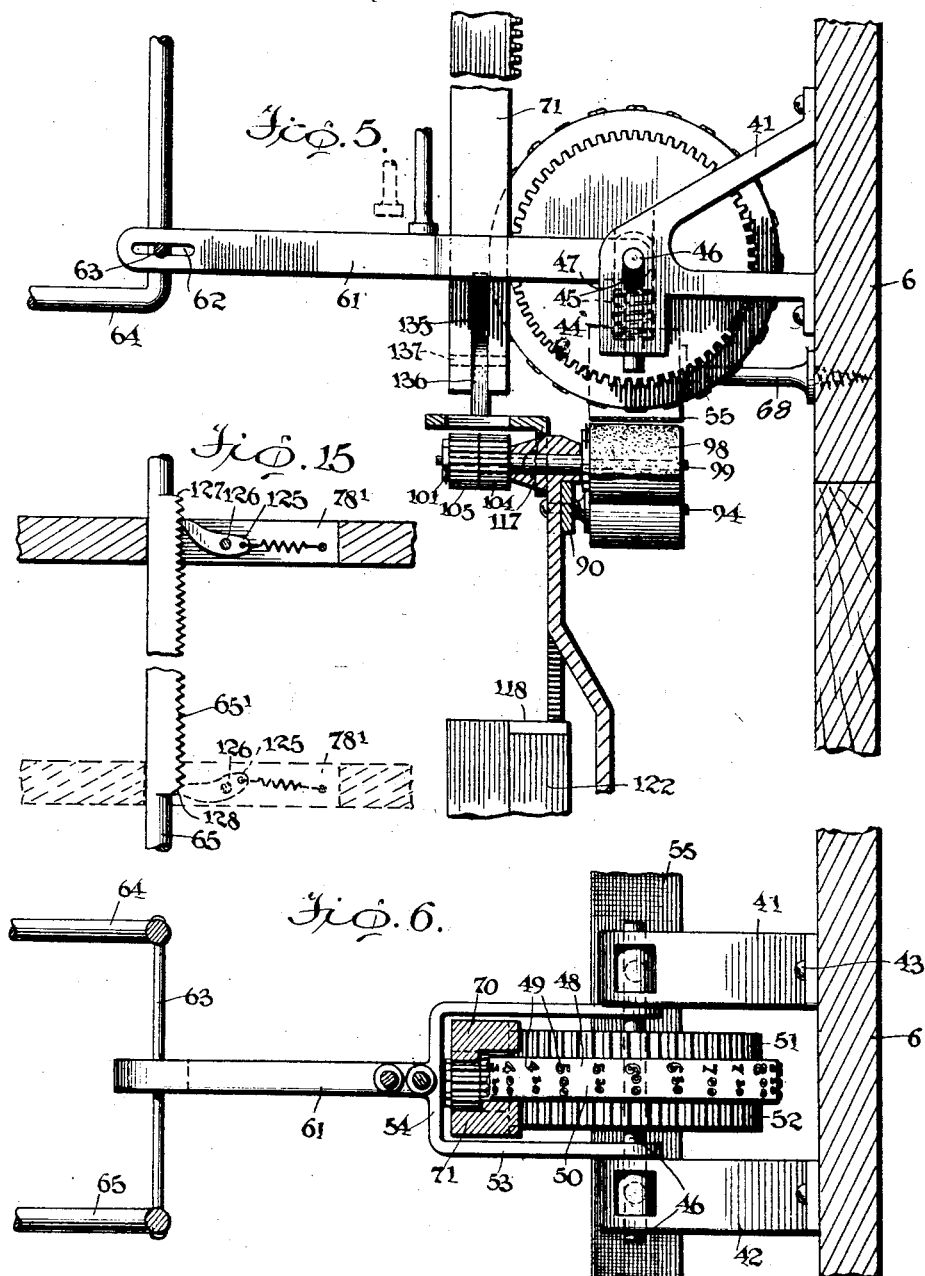

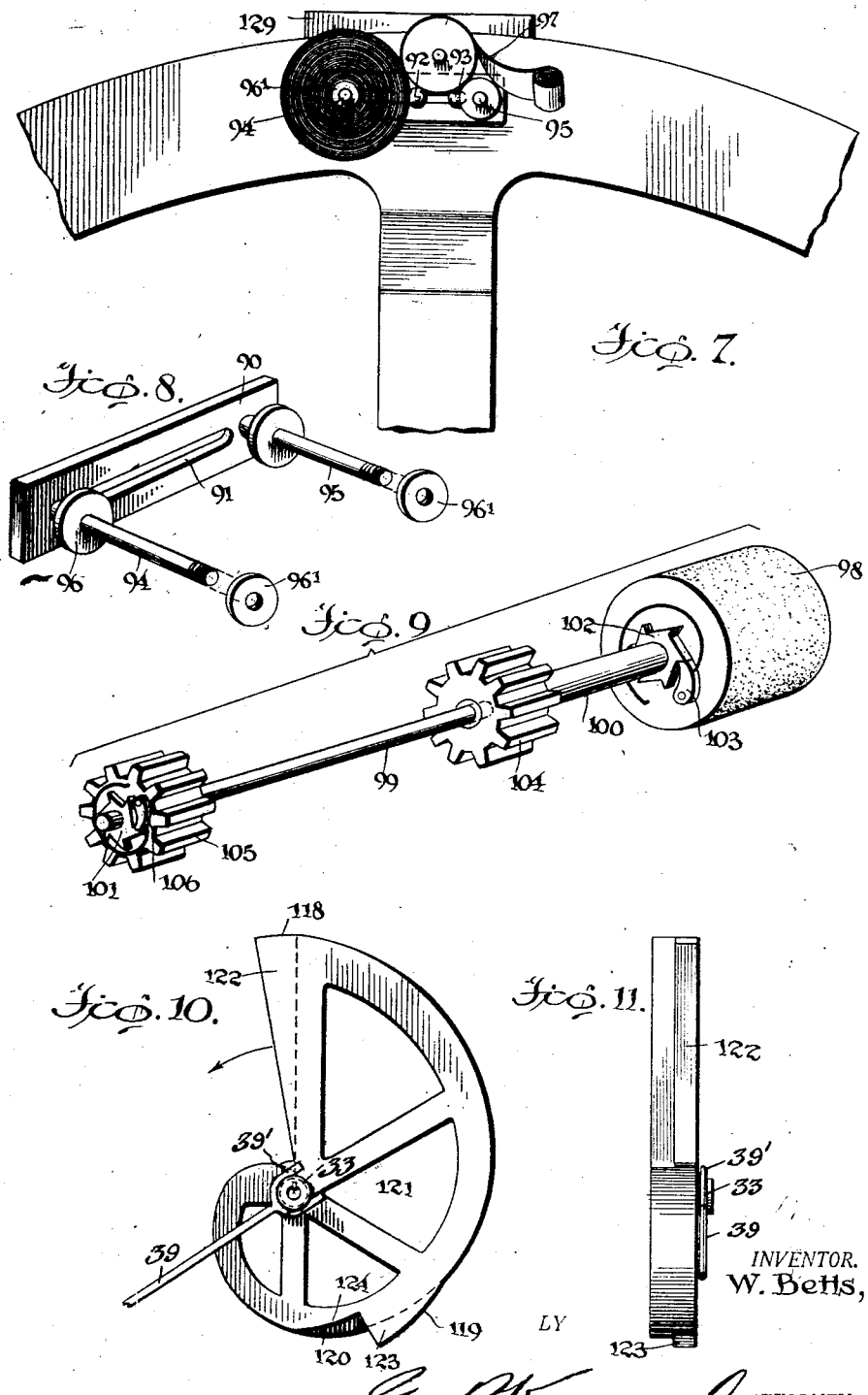

Oct. 28, 1924.
W. B. BETTS
1,513,215
RECORDING AND WAGE COMPUTING CLOCK
Filed Sept. 15, 1923 6 Sheets-Sheet 6
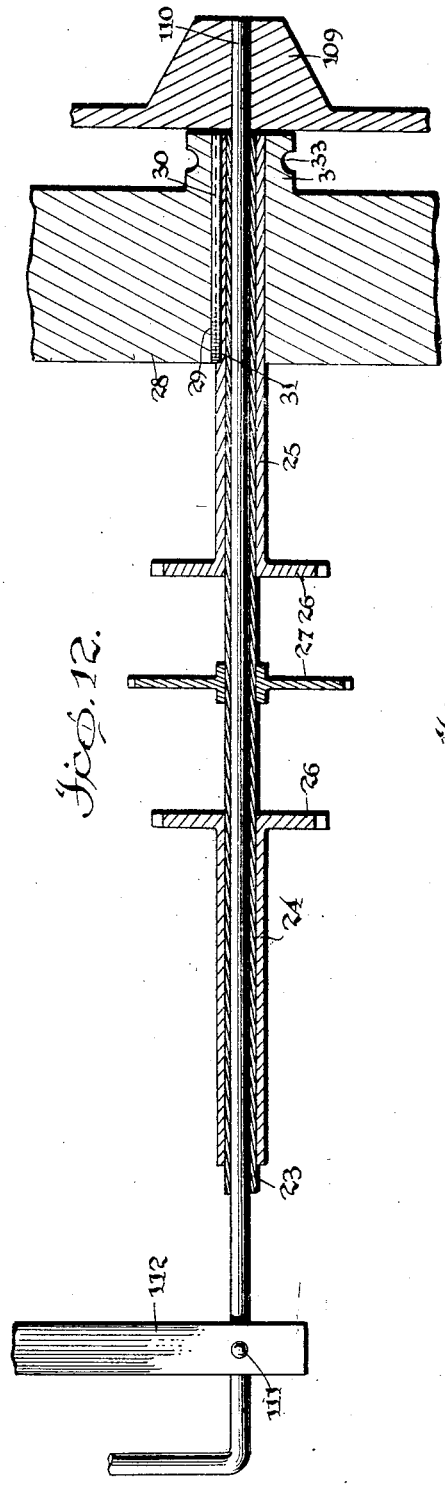
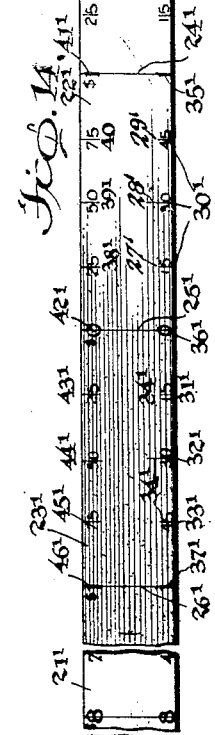
INVENTOR.
W. Betts,
Geo. P. Kimmel
ATTORNEY.

Patented Oct. 28, 1924.

1,513,215

UNITED STATES PATENT OFFICE.

WILLIAM B. BETTS, OF JOHNSON CITY, NEW YORK.

RECORDING AND WAGE-COMPUTING CLOCK.

Application filed September 15, 1923. Serial No. 662,978.

*To all whom it may concern:*

Be it known that I, WILLIAM B. BETTS, a citizen of the United States, residing at Johnson City, in the county of Broome and State of New York, have invented certain new and useful Improvements in a Recording and Wage-Computing Clock, of which the following is a specification.

This invention relates to time recording and wage computing clocks, and has for its object to provide, in a manner as hereinafter set forth, a clock of such type including means for not only recording the time of entrance and leaving of an employee respectively upon and from duty or employment, but further for computing and indicating the number of hours the employee was on duty or employed, as well as computing and indicating the aggregate amount of compensation due the employee for the number of hours on duty or employed for a predetermined wage amount per hour.

A further object of the invention is to provide, in a manner as hereinafter set forth, a time recording and wage computing clock, having as an element thereof an intermittently shiftable independent record tape for each employee, and so arranged as to receive a record of time of entry and departure of the employee, as well as provided with means for computing and indicating the aggregate number of hours the employee was on duty or employed, so that on the examination of the tape, the employer can quickly ascertain the aggregate number of hours of employment, and to further provide the tape with means, for computing and indicating the aggregate amount of compensation due the employee for the number of hours employed for a predetermined wage amount per hour.

Further objects of the invention are to provide, in a manner as hereinafter set forth, a time recording and wage computing clock, which is comparatively simple in its construction and arrangement, accurate in operation, thoroughly efficient in its use, conveniently operated for recording and indicating purposes for not only indicating the aggregate number of hours an employee was on duty, but also for recording the time of entry and departure of the employee, and further for computing and indicating the amount of compensation due the employee, readily assembled and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 2 is a front elevation with the front wall of the inclosing casing removed.

Figure 3 is a side elevation, broken away, with one wall of the inclosing casing removed.

Figure 4 is a perspective view of the combined actuating and setting bars.

Figure 5 is a fragmentary view, in side elevation, partly in section, illustrating the recording mechanism.

Figure 6 is a plan of Figure 5.

Figure 7 is a rear elevation, broken away, of the bodily shiftable carrier for positioning the record tape with respect to the recording mechanism.

Figure 8 is a perspective view of the supporting element of the record tape mechanism.

Figure 9 is a grouped perspective view of the operating means for the record tape forming elements of the record tape mechanism.

Figure 10 is a rear elevation of the controlling cam.

Figure 11 is a side view thereof.

Figure 12 is a fragmentary view, illustrating the controlling shafts of the time mechanism, controlling cam and bodily shiftable tape carrier.

Figure 13 is a plan view of one form of record tape employed solely for computing the aggregate number of hours employed.

Figure 14 is a plan view of another form of record tape used for computing the number of hours employed for an aggregate amount of compensation due the employee.

Figure 15 is a fragmentary view, in full and dotted lines, of the controlling means for the handle.

Figure 1:
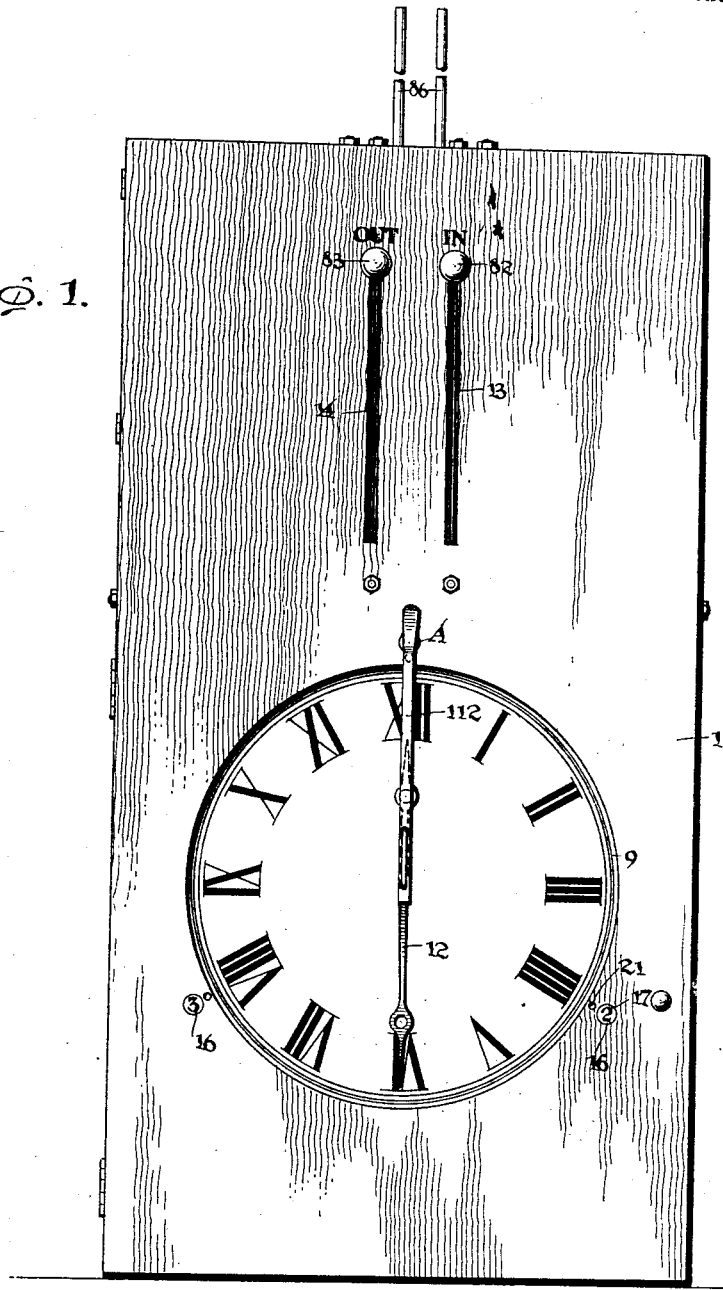
Figure 1 is a front elevation of a time recording and wage computing clock, in accordance with this invention.

A time recording and wage computing clock in accordance with this invention, comprises an inclosing casing, a clock mechanism, a recording mechanism, a pair of combined actuating and setting devices cooperating with said recording mechanism, an intermittently operable independent tape mechanism for each employee and operated from said devices, a bodily shiftable carrier for the tape mechanisms to separately position these latter in operative relation with respect to the recording mechanism, a controlling cam operated from the clock mechanism, a combined supporting and shifting device for the carrier and a bodily shiftable means for the controlling cam.

A time recording and wage computing clock in accordance with this invention, is so set up whereby each employee will have a record tape for his own use, and the said record tape will have recorded thereon the time of entry and departure of the employee and with the tape so set up that at the point of record thereon to indicate the departure of an employee, it will also indicate the aggregate number of hours the employee was on duty and also if desired, the aggregate amount of compensation due the employee for the time the employee was on duty and cooperating with several independent record tapes, as well as being common to said record tapes, is a pair of combined actuating and setting bars, one operated when the employees are entering on duty and the other by the employees when leaving or quitting. The said combined actuating and setting bars are also operated one at the beginning of the luncheon hour and the other when the employee is entering on duty at the end of the luncheon hour. Each employee positions his record tape for the purpose of having recorded thereon the time of entry or departure and after the tape has been positioned, a combined actuating and setting device is operated by the employee for the purpose of setting the recording mechanism in proper position with respect to the record tape so that when said mechanism, after being set for operation is depressed it will mark the time of entry or departure on the record tape. The operation of the combined actuating and setting devices is controlled by the controlling cam for the purpose of limiting the operation of either of said bars to provide for the correct recording of the time of entry or departure on the record tape, and said controlling cam is connected with and revolved by the clock or time mechanism. The combined actuating and setting devices are so set up as to automatically return to normal or inoperative position after they have been shifted by an employee and pressure is removed therefrom.

The tape mechanisms include means operated from the combined actuating and setting devices for shifting the tape the necessary distance to provide for the marking or recording therein at the proper point, at the time of entry or departure, so that said record on the tape will cooperate with the means thereon to indicate the aggregate number of hours employed, as well as the aggregate amount of compensation due the employee.

As illustrated, the inclosing casing is of substantial height and comprises a front wall 1, a pair of side walls 2, 3, a top 4, bottom 5, and a rear wall formed of a fixed section 6 and a pair of hinged sections 7 and 8. The sections 7 and 8 constitute doors so that access can be had to the interior of the casing when occasion so requires.

The front wall 1, is formed with an enlarged opening 9, in which is mounted a clock dial 10, and a transparent panel 11, which forms a protective medium for the hands 12 of the clock or time mechanism, as well as for the dial 10. Above the opening 9 and at each side of the vertical center of the front wall 1, the latter is formed with a pair of substantially elongated spaced parallel slots 13, 14, extending lengthwise of the front wall 1.

Surrounding the opening 9, as well as spaced therefrom a substantial distance, is a series of openings, as shown by way of example, three in number and which are indicated at 16. The number of openings 16 will be greater than or correspond to the number of employees for which the apparatus is designed to keep time of, as well as compute the aggregate number of hours employed and also the aggregate amount of compensation due. Each employee is designated a number and has assigned to him or her an independent record tape which bears a number corresponding to the number by which the employee is designated. The carrier for the record tape mechanism is provided with numbers 5 corresponding to the numbers which the employees are designated, and these numbers correspond to the numbers on the record tape and the numbers which are provided on the carrier are visible through the opening 16, as indicated at 17, so that the employee can readily ascertain his or her record tape mechanism on the carrier so that after ascertaining such record tape mechanism the latter can be shifted to cooperative position with respect to the recording mechanism.

The front wall 1 is furthermore provided with openings 18, 19, and a series of pockets 21. The function of the openings 18 and 19 will be hereinafter referred to. The number of pockets 21 correspond to the number of openings 16, and each pocket 21 is positioned between the opening 16 and the opening 9 and the function of the pockets 21 will be presently referred to.

The clock or time mechanism, best shown in Figures 2, 3 and 12, is indicated at 22, and is of any suitable construction, with the exception that the shaft 23 for the hour hand is hollow for a purpose to be hereinafter referred to and further a pair of shafts 24, 25 are mounted upon the shaft 23, operated synchronously and each provided with a driving pinion 26. The driving pinion of the shaft 23 is indicated at 27. The shaft 23, as well as the shaft 24, extends through the dial 10, and the shaft 23 carries the hour hand and the shaft 24 the minute hand. The shaft 25 carries therewith a controlling cam to be hereinafter referred to, and said cam not only rotates bodily with the shaft 25, but it is capable of being shifted lengthwise of said shaft 25. The controlling cam is indicated at 28 and is provided with a groove 29 in which extends a key 30, mounted in the groove 29 and also in a groove 31 formed in the shaft 25. The cam 28 has an extended hub 32, formed with a peripheral groove 33. The clock mechanism is secured to a pair of vertically disposed standards or supports 34, 35, which are fixedly secured at their lower ends, by the hold-fast devices 36, to the bottom 5. The clock or time mechanism 22 has a winding shaft 37, and access is had thereto for the purpose of winding the clock mechanism through the opening 19 in the front wall 1.

Extending through the opening 18 of the front wall 1, is a shifting member 38, having an angle shaped inner end 39 which is forked, as at 39' to engage in the groove 33 for the purpose of shifting the controlling cam 28 for a purpose to be hereinafter referred to, on the shaft 25 Figures 2, 3, 10 and 11. The shifting member 38, at its outer end, has a removable knob or handle 40 to facilitate the manual shifting of said member 38.

The recording mechanism, best shown in Figures 2, 3, 5 and 6, which is employed for marking the time of entry or departure on the record tape, includes a pair of supporting brackets 41, 42, which are fixedly secured by the hold-fast devices 43 to the section 6 of the rear wall. Each of the brackets 41, 42, has a depending portion 44 at the free end thereof and which provides a socket for a vertically movable spring controlled bearing 45, for a marker wheel shaft 46, and with the end terminals of said shaft 46 extended through vertical slots 47, formed in the free ends of the brackets 41, 42.

Fixedly secured to the shaft 46, centrally thereof, is a marker wheel 48, having its periphery provided with circumferentially extending printing or stamping elements 49, and as shown are set up to print or stamp the hours of the day and fractions of the hour. The fractions are shown as fifteen minutes, thirty and forty-five minutes, although the fractional indications of the hour may be different from what is illustrated. The fractional indications of the hour are designated at 50. The marking, printing or stamping wheel has the stamping elements arranged consecutively to indicate the hours from one to twelve and between each pair of hours is arranged the fractional indications 50. Fixedly secured to the shaft 46, is a pair of gear wheels 51, 52, and one of which is arranged at each side of and in close proximity to the marker wheel 48, and the said gear wheels 51, 52, are each adapted to be independently actuated for the purpose of rotating the shaft 46 to position the marker wheel at the proper point for printing or stamping the time of entry or departure on the record tape of the record tape mechanism. The manner in which the wheel 51 or 52 is operated for the purpose of rotating the shaft 46 will be hereinafter referred to.

Mounted on the shaft 46, at each side of a gear wheel is an arm 53 of a shifting yoke 54, which when actuated, in a manner as hereinafter referred to, is adapted to force the marker wheel 48 downwardly to engage an ink or stamping ribbon 55 for the purpose of marking, printing or stamping the time of entry or departure on the record tape.

The head of the yoke 54 has projecting therefrom an arm 61, formed with a lengthwise extending slot 62 of substantial length, which is mounted on a supporting bar 63, secured to a pair of depending spaced angle shaped guide members 64, 65, which are fixedly secured at one end, as at 66, to the front wall 1 and as at 67 to the top 4. The vertical leg of each of the members 64 and 65 is formed with a row of transverse teeth 65'.

Projecting forwardly from the fixed section 6 is a pair of supports 68, and upon each of which is wound the printing or marking ribbon 55, as at 69. As illustrated in Figure 5, the printing or marking ribbon 55 is shown arranged below but in close proximity to the marker wheel 48.

The pair of combined actuating and setting devices cooperating with said recording mechanism and which also cooperate with the record tape mechanisms, best shown in Figures 2, 3, 4 and 6, are of like construction, and the description of one will apply to the other. One combined actuating and setting device cooperates with the recording mechanism and the record tape mechanism on entry of an employee, and the other device on departure of an employee, that is to say, one of said devices will actuate and position the recording mechanism to mark on the record tape the time of entry and when actuating and setting the recording mechanism it will also actuate the record tape mechanism to shift the record tape to the proper point to receive the marking from the recording mechanism, and the other device will actuate in a similar manner to make the record of the time of departure of the employee.

Each of said devices includes a vertically disposed toothed setting bar and the bar of one of said devices is indicated at 70 and the bar of the other of said devices indicated at 71. Each setting bar not only actuates and positions the record tape mechanism, but substantially simultaneously with the operation of said mechanism the bar operates the combined recording mechanism. The bar 70, as well as the bar 71 has its rear edge for a portion of its length provided with transversely extending teeth, as indicated at 72, and said teeth 72 extend from the upper end of the bar and terminate at a point removed from the lower end, thereby providing a plain surface 73. The inner bar 70, as well as the bar 71, has its inner side edge provided with transversely extending teeth 74 which are of less length than the width of said edge and start at the forward edge of the bar, thereby providing the inner side edge of the bar with a plain surface 75. The teeth 74 extend from the upper end to the lower end of the record. The teeth 74 on the bar 70 do not oppose the teeth 74 on the bar 71, but oppose the plain surface 75 of the bar 71. The teeth 75 of the bar 71 oppose the plain surface 75 of the bar 70.

The bar 71 is shifted by the employee to mark his time when entering on duty, and the bar 70 is shifted by the employee for the purpose of marking the employee's time of departure.

The teeth 74 of the bar 71 are employed for actuating and setting the record tape mechanism and the teeth 72 of the bar 71 engage with the gear wheel 52 for the purpose of positioning the marking wheel 48. The teeth 74 of the bar 70 actuate the record tape mechanism for the purpose of shifting the tape, and the teeth 72 of the bar 70 are employed for actuating the gear wheel 51 to rotate the shaft 46 to position the marking wheel 48.

The bars 70 and 71 are set up so that they will be in close proximity to the gears 51 and 52 for the purpose of actuating them, but also to provide a clearance for the marker wheel 48.

As to the position of the bars 70 and 71 with respect to the gear wheels 51 and 52 and marker wheel 48, attention is directed to Figure 6.

The bars 70 and 71 are normally maintained in an elevated position and with the teeth 74 clear of the record tape mechanism and the teeth 72 clear of the gear wheel 51, 52, through the medium of a counter-weight 76, connected by a flexible member 77, to a handle 78, which is disconnected from and has its inner end support a weighted lower block 79, having formed integral therewith, as well as depending therefrom, a setting bar. On the lowering of the handle 78 the block 79 can move the required distance carrying the setting bar therewith. When the handle 78 moves upwardly, it carries block 79 therewith. The flexible member 77 is trained over a pulley 80 supported in a bracket 81, which is dependingly secured to the top 4. The handle 78, which associates with the bar 71, extends outwardly through the slot 13 and is provided with a removable knob 82. The handle 78, which associates with the bar 70 projects outwardly through the slot 14 and is provided with a removable knob 83. Formed integral with the guide member 64, as well as with the guide member 65, is a vertically disposed guide rod 84, fixedly secured at its upper end, as at 85, to the top 4, and which is arranged in alignment with the vertical leg of that guide member 64 or 65 with which it is formed integral. The vertical leg of the guide member 65 and the guide member 64, extends through a slot 78' in the handle 78 for releasing and lifting the setting bar 71, and the vertical leg of the guide member 64, extends through a like slot in the handle 78 which associates with the setting bar 70. The members 64, 65, and bars 84, constitute guides for the handles 78. Each head 79 has extending upwardly therefrom, a guide rod 86 which projects through an opening in the top 4, and each head 79 travels on the vertical leg of an angle shaped guide member 87, which is fixedly secured, as at 88, to a side wall 2 or 3 and as at 89 to the top 4. The rods 86 and members 87 constitute guides for the head 79 and the setting bars 70 and 71 during the vertical movement thereof. The rods 84 and 86 and members 64, 65 and 87 constitute guides during the operation of the combined actuating and setting devices and furthermore constitute means for maintaining the setting devices in spaced relation and further in cooperative position with respect to the recording mechanism and also with respect to the record tape mechanisms when these latter are positioned in cooperative relation with respect to the recording mechanism.

The weights 76 automatically return an actuating and setting device to normal or inoperative position when pressure is removed from a handle 78 and the weight 79 shifts the setting device to operative position when pressure is applied to the handle 78.

The apparatus includes a series of record tape mechanisms each of which is independently operated and each of which is for use in connection with an employee, so that each of the employees will have an independent record tape mechanism. The record tape mechanisms are connected with a carrier to be presently referred to, and each carrier is bodily shiftable for the purpose of positioning a record tape mechanism in cooperative relation with respect to a recording mechanism, so that the record tape of the record tape mechanisms can have printed, stamped or marked thereon the time of entry or departure of an employee. The record tape mechanisms are equally spaced on the carrier, and each record tape mechanism, best shown in Figures 3, 5, 7, 8 and 9, consists of a rectangular supporting plate 90, provided with a lengthwise extending slot 91, through which is adapted to extend a pair of headed pins 92, 93, for the purpose of slidably connecting the plate 90 to the carrier. The pins 92, 93, are fixedly secured to the rim of the carrier. Fixed to the plate 90, is a pair of supporting shafts 94, 95, and the shaft 94 is positioned beyond one end of the slot 91 and the shaft 95 beyond the other end of the slot 91. The shafts 94, 95, have formed integral therewith, in proximity to the plate 90, a disk 96. The record tape is indicated at 97 and has its end terminal portions wound in a roll-like manner on the shafts 94, 95, and retained thereon by the removable collars 96'. As the roll of the record tape 97 increases in diameter on the shaft 94, its abutting against the pin 92, will shift the plate in a direction away from the pin 92, and as the tape winds on the shaft 95, the roll bearing against the pin 93 will shift the plate 90 in a direction away from the pin 93.

The apparatus is so set up that when the setting bar 71 is moved downwardly by an employee, the tape 97 will be shifted forwardly a predetermined distance and wind in a roll-like body on the shaft 95, and when the bar 70 is operated by the employee, the tape 97 will be shifted rearwardly a predetermined distance, and wind in a roll-like manner on the shaft 94. The means for shifting the tape 97 in the manner as stated, consists of a friction roller 98, over which the tape 97 is trained and the roller 98 is operated in a clockwise direction to shift the tape 97 to receive the time of entry of the employee and operated in an anti-clockwise direction to shift the tape 97 to receive the time of departure of an employee. The roller 98 is arranged directly over the pins 92, 93, and not only engages that portion of the tape 97 which extends from the roller tape 94 on the shaft 95, but also engages the tape when rolled or wound on the shafts 94, 95, and the friction engagement of the roller 98 is such as to provide for the shifting of the tape 97 in the manner as stated. The tape 97 is shifted rearwardly and forwardly to provide for the computing of the aggregate number of hours which the employee was on duty, and also for computing the aggregrate amount of compensation due the employee for the number of hours employed at a predetermined wage amount per hour and this manner of computing by the record tape will be hereinafter more specifically referred to.

The roller 98 has connected therewith a pair of driving shafts therefor and one of said shafts is indicated at 99 and the other at 100, and with the shaft 99 extended through the shaft 100 and connected with the roller 98. The shaft 100 is also connected to the roller 98. The shaft 99 is employed for driving the roller 98 in a clockwise direction and the shaft 100 operates the roller 98 in an anti-clockwise direction. The shaft 99 is provided with a ratchet wheel 101 and the shaft 100 is provided with a ratchet wheel 102. The roller 98 carries a spring controlled pawl 103 which engages with the ratchet wheel 102 for coupling the shaft 100 therewith to provide for the driving of the roller 98 when the shaft 100 is operated. Fixed to the shaft 100 is a driving pinion 104 which is operated by the teeth 74 of the bar 73, and when the pinion 104 is operated, the pawl 103 engaging with the ratchet wheel 102 will provide for the driving of the roller 98 in an anti-clockwise direction. Loosely mounted on the shaft 99 is a driving pinion 105, carrying a spring controlled pawl 106, engageable with the ratchet 101, to provide for the operation of the shaft 99 to operate the roller 98 in a clockwise direction. The teeth 74 of the setting bar 71 operate the pinion 105. The shaft 100 is coupled with the roller 98 when the setting bar 70 is moved downwardly, but on the upward movement of the said bar, the shaft 100 is not coupled with the roller 98. The shaft 99 is operated through the medium of the pinion 105 only when the setting bar 71 moves downwardly, as it is only on the downward movement of the bar 71 that the pinion 105 is coupled with the shaft 99 for the purpose of driving the friction roller 98. The pinion 105 is arranged in close proximity to the pinion 104 but disconnected therefrom so that on the operation of the pinion 105 it will not drive the pinion 104.

The shafts 99 and 100 extend through a suitable bearing on the carrier and which will be presently referred to, and the said shafts 99 and 100 project forwardly from the carrier so that the pinions 104, 105, will be positioned in the path of the setting bars 70, 71, or rather in the path of the teeth of said bars, as shown in Figure 6. The shaft 99 projects forwardly from the shaft 100, and is provided with suitable means to prevent lengthwise shifting of the shafts with respect to the bearing in which the shaft is mounted, so that the roller 98 will be retained in position for the purpose of shifting the tape 97. The roller 98 also constitutes a platen or support for the tape during the printing, marking or stamping operation and said roller 98 maintains the tape in close proximity to the ink or marking ribbon 55 when the carrier positions a record tape mechanism in operative relation with respect to the recording mechanism.

The carrier for the record tape mechanisms, best shown in Figures 2, 3, 5 and 7, is in the form of an enlarged wheel consisting of an annular rim 107 having formed integral therewith a series of spokes 108 which are offset with respect to the rim 107 and terminate in a hub 109, which is fixedly secured to the inner end of a shaft 110 extended through the shaft 23 and which also constitutes a bearing for said latter shaft. The shaft 110 projects outwardly from the forward end of the shaft 23 and also through the transparent panel 11, and further projects from the front wall 1. The shaft 110 is a shifting member for the carrier and has pivotally connected therewith, as at 111, a handle 112, formed near its free end with an inwardly extending arm 113 adapted to engage in a pocket 21 for the purpose of maintaining the carrier in the position to which it has been shifted. The shaft 110, at its outer end, has an angle shaped extension 114 which projects into the handle 112, as at 115, and carried by the extension 114 and bearing against the handle 112 is a coiled spring 116, the function of which is to normally maintain the arm 113 in a pocket 21 to releasably secure the carrier in the position to which it has been shifted. The pivotal connection 111 between the handle 112 and shaft 110 provides for the shifting of the handle 112 to released position to enable the shifting of the carrier, when occasion so requires.

The rim 107 is provided with a series of bearings 117, and the number of bearings 117 correspond to the number of record tape mechanisms and each bearing 117 is adapted to have the shafts 99 and 100 of a record tape mechanism extend therethrough.

The bearings 117 are equally spaced and the indications or numbers 17 are arranged directly below the bearings 117 and said numbers 17 are visible through the opening 16 and in view of the manner of spacing the bearings 117, it provides for the proper setting of a record tape mechanism in cooperative relation with a recording mechanism and the securing of the record tape mechanism in the position to which it has been set, due to the fact that the handle member 112 through the medium of the arm 113 can also be positioned opposite the opening 16 and with the arm 113 engaging in a pocket 21, and in this connection, with reference to Figure 1, one can readily see that if the handle 112 is shifted from the position shown, moving the carrier therewith, to a position opposite the opening 16 through which the number 17 is visible, that the record tape mechanism designated by the number 3 will be positioned at the point indicated A, or if the record tape mechanism indicated by the number 2 is shifted to the point A, the handle 112 will be opposite that opening 16 through which the number 3 is exposed. When the handle 112 is opposite any of the openings 16, the arm 113 will engage in the pocket 21 arranged in proximity to such opening, under such conditions the carrier will be maintained to the position to which it has been adjusted.

The controlling cam, best shown in Figures 3, 10 and 11, is employed for limiting the downward movement of the setting bars 70, 71, to provide for a proper shifting of the marker wheel 48 so that the correct time indication for entry or departure will be recorded on the tape 67. The controlling cam 28, as before stated, is carried with the minute shaft 25 and is arranged in the path of the bars 70 and 71 and below the pinions 104 and 105, as shown in Figure 3. If the high portion of the cam is positioned below and in proximity to the pinions 104, 105, it it obvious that the downward movement of the setting bars 70, 71 will not be as great as if a lower portion of the cam 28 was in such position. The cam is so set up that as it revolves with the shaft 25, it will act to vary the downward movement of the bars 70, 71 to provide for a proper setting of the marker wheel 48. The cam is of substantial thickness so that whether it is in its normal or in its shifted position, it will be arranged in the path of the lower end of the bars 70 and 71. As the cam revolves with the minute shaft 25, it is obvious that it will act as a stop to control the lowering movement of the bars 70, 71, so that the marker wheel will be set at the proper position to cause the printing, stamping or marking of the time of entry or departure of an employee on the record tape 97.

The controlling cam 28 is formed with a series of concentric surfaces 118, 119 and 120. The purpose of such concentric surfaces is to set up a means for uniformly limiting the downward movement of the setting bars 70, 71 when operated by all of the employees at the time of entry at the beginning of the day's employment or at the time of departure at the end of the day's employment and at the time of entry of the employees at the end of the luncheon period. By this arrangement, the tape mechanisms are correspondingly marked the same time on the entry of the employees on duty if they enter prior to and up to the time of the beginning of the day's work, and a corresponding record is made at the time of departure of the employees at the closing of the day's work, and also with respect to entry of the employees at the closing of the luncheon hour. It will be assumed that the time of beginning the day's work is eight o'clock, that the time of the closing of the day's work is five o'clock and that the close of the luncheon hour is one o'clock. The concentric surface 120 is such that it will provide for uniformly registering seven o'clock, during a period of from six to seven o'clock. The concentric surface 119 is such that it will provide for recording five o'clock from a period of from five to six o'clock, and the concentric surface 118 is such as to provide a uniform record of one o'clock for a period of from twelve-thirty to one o'clock. When the concentric surfaces of the cam 28 are employed to provide for uniform record of the employees, the cam is shifted forwardly, through the medium of the element 38, so that the concentric surfaces 118, 119 and 120 will be positioned in the path of the lower ends of the setting bars 70, 71. If this uniform recording is not desired, the cam 28 is so positioned that the concentric surfaces 118, 119 and 120 are moved clear of the path of the lower ends of the setting bars 70, 71. The element 38 is connected with the hub 32 of the cam 28 in such a manner as to not interfere or retard the operation of the shaft 25 which carries the cam 28. The cam 28 is cut away, as at 121 to decrease the weight thereof and is offset, as at 122 and 123 to provide for the concentric surfaces 118 and 119 and is in cut as at 124 to provide for the concentric surface 120.

The record tape, in the form shown in Figure 13 or that shown in Figure 14, consists of a body portion of any suitable flexible material, preferably of a strip of narrow paper of the desired weight. Referring to Figure 13 of the drawings, the body portion of the tape is provided with two series of hour spaces and with one series extending in opposite direction with respect to the other series. The hour spaces of one series are indicated at 2' and the hour spaces of the other series at 3'. The number of hour spaces 2' is greater than the number of hour spaces 3'. Each hour space 2', as well as each hour space 3' is divided into quarters, each quarter indicating fifteen minutes. The indications for dividing each hour space 2' into quarters of fifteen minutes, are indicated at 4', 5' and 6' and the indications for dividing each hour space 3' into quarters of fifteen minutes are indicated at 7', 8' and 9' and are oppositely disposed with respect to the indications 4', 5' and 6'. The spaces 2' are formed by transversely extending lines 10' and a transversely extending line 11'. The spaces 3' are formed with transversely extending lines 12' and a transversely extending line 11'. The indications 4', 5' and 6' of each of the spaces 2', consist of the transversely extending lines 13', 14' and 15' and with the line 13' leading to the number fifteen, the line 14' leading to the number thirty and the line 15' extended to the number forty-five.

The indications 7', 8' and 9' of the spaces 3', consist of the lines 16', 17' and 18' and with the line 16' leading to the number fifteen, the line 17' leading to the number thirty and the line 18' extended to the number forty-five.

The transverse lines 13', 14', 15', 16', 17' and 18' are of less length than the transverse lines 10', 11' and 12'. The transverse lines 10', 11' and 12' extend entirely across the outer face of the body portion 1', whereas the transverse lines 13' to 18' extend partly across the body portion 1' from one edge thereof. The transverse lines 14' and 17' are of greater length than the transverse lines 13', 15', 16' and 18'.

Each of the transverse lines 10' is provided at one end with a number, as indicated at 19', and the said numbers run consecutively from one to forty. The transverse line 11' at one end is provided with a cipher or naught. Each of the transverse lines 12' has one end provided with a number, as indicated at 20' and the said numbers run consecutively from one to eight.

Referring to Figure 14 of the drawings, the body portion of the tape is indicated at 21' and is provided with two series of hour spaces and with the spaces of one series indicated at 22' and the spaces of the other series at 23'. The spaces 22' are formed by transversely extending lines 24' and a transversely extending line 25', and the spaces 23' are formed by transversely extending lines 26' and the transverse line 25'. Each space 22' is provided with a series of divisions to constitute fractions of an hour and each division represents fifteen minutes, and the means to constitute said fractional divisions are indicated at 27', 28', 29', and each of which consists of a short transverse line 30' leading from one edge thereof. One of the transverse lines 30' has associated therewith the number fifteen, another transverse line 30' has associated therewith the number thirty, and the other transverse line 30' has associated therewith the number forty-five. Each of the spaces 23' is divided into a series of divisions to constitute the fraction of an hour, as shown fifteen minutes, and the means to provide for such fractional divisions are indicated at 31', 32' and 33' and which include transverse lines 34'. One of the lines 34' has associated therewith the number fifteen, another of the lines 34' has associated therewith the number thirty, and the other of the lines 34' the number forty-five. The transverse lines 34' are shown to extend from one edge of the body portion 21'.

Each of the transverse lines 24' is provided with a number as indicated at 35' and said numbers run consecutively from one to forty. The transverse line 25', at one end, is provided with a cipher or naught 26'. Each of the transverse lines 26' is provided at one end with a number, as indicated at 37' and with the said numbers running consecutively from one to eight.

Each of the hour spaces 22' is furthermore provided with means opposing the fractional hour indications 27', 28' and 29' to indicate the fractional portion of a predetermined wage amount per hour, and such means is indicated at 38', 39' and 40', and by way of example, such fractional compensation is shown as twenty-five cents, fifty cents and seventy-five cents. The twenty-five cent indication opposes the quarter of an hour indication 27', the fifty cent indication opposes the one-half hour indication 28' and the seventy-five cent indication opposes the three-quarters indication 29'.

Each of the transverse lines 24', at its other end, is provided with an aggregate compensation indication and which is indicated at 41'. The aggregate compensation indications increase with respect to each other, that is to say, for the first hour when the wage amount is one dollar, the indication 41' would be one dollar. For the second hour, two dollars and for the third hour three dollars and so on with respect to the number of hour spaces 22' so that if forty hour spaces are employed the last aggregate compensation amount would be forty dollars.

The other end of the transverse line 25' is provided with a cipher or naught, as at 42', so as to indicate no compensation for the employee.

Each of the spaces 23, opposite the indications 31', 32' and 33', is provided with fractional compensation indications, as at 43', 44' and 45' for the same purpose as the fractional compensation indications 38', 39' and 40'.

Each of the lines 26' has at the other end thereof, an aggregate compensation amount indication, and which is designated 46' and are employed for the same purpose as the aggregate compensation amount indications 41', as well as set up in a manner similar to the indications 41'. The indications 27', 28', and 29' are oppositely disposed with respect to the indications 31', 32' and 33'. The indications 38', 39' and 40' are oppositely disposed with respect to the indications 43', 44' and 45'. The indications 41' are oppositely disposed with respect to the indications 46'.

When using the form of tape illustrated in Figure 13, the time of entry of the employee is stamped thereon, the tape being stamped in the space 3' at or near the number eight. Now if the employee is on duty but two hours, when a record is made of his leaving or departure, it is set up in the space 2' at or near the number two, so that it will indicate that the employee has worked two hours.

With respect to the employment of the form shown in Figure 14, the tape is stamped in a like manner as referred to in connection with the form shown in Figure 1, and it will not only indicate the number of hours the employee was on duty, but will also compute the aggregate amount of compensation due the employee for a predetermined wage amount per hour.

With respect to the aggregate compensation due the employee, if on leaving, the tape is stamped between the indications 29' and 40' in the space 22', between the numbers one and two, it would indicate that the employee was on duty one hour and forty-five minutes and that his compensation would be one dollar and seventy-five cents.

In either form of tape illustrated, the body portion of the tape is provided with two sets of indications for the computation of the number of hours an employee is on duty. Each set of indications is formed of a series of hour spaces each divided into fractional divisions of an hour. The fractional divisions are such as to indicate fifteen, thirty and forty-five minutes, by way of example, the fractional divisions are illustrated to indicate quarters of an hour. The number of hour spaces of each series can be any suitable number, by way of example one of the series can be of hour spaces from one to forty and the other from one to eight, but the number of hour spaces of either series can be any suitable number desired.

The operation of each of the several mechanisms of the device has been specifically referred to with respect to each mechanism and as to the general operation of the apparatus when an employee enters on duty, the handle 78 of the setting bar 71 is grasped and the bar 71 moved downwardly, and as it travels downwardly, the teeth 74 of said bar 71 will engage the pinion 105, causing thereby the operation of the shaft 99 and driving of the roller 98 which will shift the tape 97 a predetermined distance forwardly. As the bar 71 moves downwardly, the teeth 72 thereof will engage the gear wheel 52 and rotate the marker wheel 48 until the lower end of the bar is arrested by the cam 28. Immediately upon the stoppage of the bar 71 and before an employee releases the handle 78 of the bar 71, the employee will operate the arm 61, causing the printing, marking or stamping on the tape 97 of the time of entry. When the handle 78 is released by the employee, the weight 76 will restore the bar 71 to its operative position. On the employee's quitting work, to mark out, the handle 78 of the bar 70 is grasped and said bar lowered, and on the downward movement of the bar 70 the teeth 72 thereof will engage the pinion 74, causing the operation of the shaft 100 and the driving of the roller 98 in an anticlockwise direction and which will shift the tape 97 rearwardly a predetermined distance. As the bar 70 moves downwardly, the teeth 72 thereof will engage the gear wheel thereby revolving the marker wheel 48 until the lowering movement of the bar 70 is arrested by the cam 28 and immediately upon stoppage of the bar 70 the employee will actuate the lever 58 to provide for the printing, stamping or marking on the tape 97 of the time of departure. Prior to the shifting of the bar 71 or 70, the employee positions his record tape mechanism, with respect to the registering and recording mechanism, in a manner as heretofore referred to.

The foregoing operation is carried out, if an employee does not mark out or mark in for a luncheon period, but if he does mark out and mark in for a luncheon period, the operation of elements is had in the same manner.

The function of the controlling cam is such as to limit the downward movement of the setting bars to provide for the required shifting of the marking wheel and also the record tape.

In connection with the shifting of the record tape, if an employee enters on duty at eight o'clock the tape is stamped by the recording mechanism and if the employee continues on duty until twelve o'clock, the take is shifted rearwardly so that it will be stamped at the number four to indicate that the employee was on duty four hours. It will be assumed that the employee has a luncheon period consisting of one hour. On the return to duty the employee will mark in, but when marking in his time of entry it will be recorded at the number three on the tape, the latter being shifted forwardly for such purpose. Now it will be assumed that the employee quits at four o'clock and on marking out the tape will be shifted so that the time record will appear at the number seven, under such conditions indicating that the employee has worked seven consecutive hours and further indicating that the aggregate wage amount will be seven dollars.

The providing of the tape with the two series of hour spaces enables the proper recording of continuous service and which can only be obtained by the forward and backward shifting of the tape respectively on entering and leaving, or in other words, when the employee is marking in and marking out.

In connection with the manner of specifically shifting the record tape, the tape is set at zero, that is to say, the zero indication of the tape is arranged below the marker wheel and with that portion of the tape containing the hour spaces 3' rolled on the shaft 94 and that part of the tape with the spaces 2' rolled on the shaft 95. If an employee enters on duty at eight a. m., the mechanism will shift the tape forwardly eight spaces and the tape will be stamped with the time of entry at the number eight of the space 3'. Now if the employee continues on duty until twelve o'clock and is marking out, the mechanism will shift the tape rearwardly twelve spaces so that the latter will be stamped at the number four to indicate that the employee was on duty four hours, computing forwardly from zero. It will be assumed that the employee has a luncheon period consisting of one hour. On the return to duty, the employee will mark in but when marking in, his time of entrance will be recorded at the number three of the space 2', the tape being shifted forwardly one space for the purpose. Now it will be assumed that the employee quits at four o'clock and in marking out, the tape will be shifted rearwardly four spaces so that the time recorded will appear at the number seven of the space 2', under such conditions indicating that the employee has worked seven consecutive hours and further indicating that the aggregate wage amount will be seven dollars.

The hour spaces 3' are provided for the purpose of controlling the time or record for the first entry on duty. If entry be at seven a. m., the first day, the forward shifting of the tape would be seven hour spaces of the space 3'. If the employee enters at six a. m., the forward shifting would be six hour spaces of the spaces 3'. The hour spaces 3', as before stated, can be of a greater number than shown, and it is also obvious that the hour spaces 2' can be of a greater number than shown.

The apparatus further includes a means to control the operative movement of each handle 78, so as to prevent the surreptitious operation thereof to actuate the marker or printing mechanism, or in other words, compelling a complete downward stroke to the handle and a complete upward stroke after the completion of the downward stroke, under such conditions preventing any possibility of surreptitious adding of time. The said means, best shown in Figure 15, includes the teeth 65' of the vertical leg of the member 64 or 65, and which are engaged by a double acting spring controlled pawl 125 pivoted as at 126, within the slots 78'. The teeth 65' do not extend the entire length of the vertical leg of a guide member, are offset with respect thereto, to form the shoulders 127, 128, the former provides for reversing the position of the pawl when handle moves upwardly and the latter when the handle moves downwardly. The teeth 65' in connection with the pawl 125, compels a full stroke of the handle in either direction before the pawl will be released.

The apparatus further includes a stop device to prevent the shifting of the record tape successively in the same direction, to overcome surreptitious marking thereof, or in other words, the stop device compels the record tape to be shifted in alternate directions for entry and exit records. The stop device is common to the setting bars and a record tape mechanism, and comprises a plate 129 provided with a pair of polygonal openings 130 and 131. Formed integral with one side of the plate 129 is a pair of slotted spaced wings 132, 133 which are slidably connected by the headed members 134 to the rim 107. With each tape mechanism a plate 129 associates, and the wings 132, 133 are spaced sufficiently to provide a clearance for the bearing 117. Each setting arm 70 or 71, has its lower end provided at one side with a lengthwise pocket 135 and pivotally mounted therein is a shifting arm 136. The pivot of the arm 136 is indicated at 137, and a stop pin for limiting the movement of the arm 136, is indicated at 138. The arm 136 is pivoted near its lower end to lower end of the pocket 135 and said arm 136 normally extends from the pocket 135, at a downward inclination, and is capable of seating completely in the pocket on downward movement of the setting bar. The arm 136 being engaged and shifted into the pocket 135, by the plate 129, as the bar 70 or 71 passes down through an opening in said plate, when the bar 70 or 71 is moved downwardly to set the marker mechanism and the bar 70 or 71 will continue to move downwardly until it is arrested by the controlling cam. When the bar 70 or 71 passes through an opening in the plate 129, to an extent whereby the pocket 135 will be cleared, the arm 136 will fall out of the pocket below the plate 129. When the bar 70 or 71 is moved upwardly the inclined arm 136 will shift the plate 129 in a direction to position the other opening in the plate 129 in the path of the other bar so that the latter can perform its setting function when lowered. The plate 129 is always so positioned that it will only allow the operation of the proper setting bar, and be positioned or shifted alternately in opposite directions to be properly set.

An alarm 139 is engaged by the handles 78 at the limit of their downward movement to indicate the recording.

Although the controlling cam 28, as illustrated, is shown as provided for what may be termed twelve hour service, it is obvious that the cam can be so set up that the clock will give twenty-four hour service instead of twelve, and with the cam set up to change at midnight or on set time and which will move half as fast as the hour hand on the mechanism. It is to be understood that the controlling cam can be set up for employment in connection with service for any fractional portion of a twenty-four hour service or for the entire twenty-four hours if desired.

An apparatus in accordance with this invention not only provides for recording the time of entrance and leaving of an employee, but further provides for computing and indicating the aggregate number of hours the employee was on duty, as well as computing and indicating the aggregate amount of compensation due the employee for the number of hours employed for a predetermined wage amount per hour.

What I claim is:—

1. An apparatus for the purpose set forth comprising a plurality of independent record tape mechanisms, a recording mechanism common to said record tape mechanisms, means for selectively positioning said record tape mechanisms in cooperative relation with respect to the recording mechanism, and means common to said positioned record tape mechanism to provide for the setting of said mechanisms to record the time of entry or departure.

2. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism to provide for the setting of said mechanisms to record the time of entry or departure, a controlling cam for said setting means, and a clock mechanism for revolving said cam.

3. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism to provide for the setting of said mechanisms to record the time of entry or departure, a controlling cam for said setting means, and a clock mechanism for revolving said cam, said cam formed with concentric surfaces coacting with said means to provide for a corresponding record of the time of entry or departure on the selectively positioned record tape mechanisms.

4. An apparatus for the purpose set forth comprising a plurality of independent record tape mechanisms, a recording mechanism common to said record tape mechanisms, means for selectively positioning said record tape mechanisms in cooperative relation with respect to the recording mechanism, and means common to said positioned record tape mechanism to provide for the setting of said mechanisms to record the time of entry or departure, and said means provided with a retaining element for maintaining the record tape mechanism in the position to which it has been shifted.

5. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism to provide for the setting of said mechanisms to record the time of entry or departure, a controlling cam for said setting means, a clock mechanism for revolving said cam, and said means provided with a retaining element for maintaining the record tape mechanism in the position to which it has been shifted.

6. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism to provide for the setting of said mechanisms to record the time of entry or departure, a controlling cam for said setting means, a clock mechanism for revolving said cam, said cam formed with concentric surfaces coacting with said means to provide for a corresponding record of the time of entry or departure on the selectively positioned record tape mechanisms, and said means provided with a retaining element for maintaining the record tape mechanism in the position to which it has been shifted.

7. An apparatus for the purpose set forth comprising a plurality of independent record tape mechanisms, a recording mechanism common to said record tape mechanisms, means for selectively positioning said record tape mechanisms in cooperative relation with respect to the recording mechanism, a combined actuating and setting device common to said positioned record tape mechanism and the recording mechanism for setting them to record the time of entry, a combined actuating and setting device common to said positioned record tape mechanism and the recording mechanism for setting them to record the time of departure, a controlling cam common to said devices, and a clock mechanism for revolving said cam.

8. An apparatus for the purpose set forth comprising a plurality of independent record tape mechanisms, a recording mechanism common to said record tape mechanisms, means for selectively positioning said record tape mechanisms in cooperative relation with respect to the recording mechanism, a combined actuating and setting device common to said positioned record tape mechanism and the recording mechanism for setting them to record the time of entry, a combined actuating and setting device common to said positioned record tape mechanism and the recording mechanism for setting them to record the time of departure, a controlling cam common to said devices, and a clock mechanism for revolving said cam, said cam formed with concentric surfaces common to said devices to provide for a corresponding record of the time of entry or departure on the selectively positioned record tape mechanisms.

9. An apparatus for the purpose set forth comprising a plurality of independent record tape mechanisms, a recording mechanism common to said record tape mechanisms, means for selectively positioning said record tape mechanisms in cooperative relation with respect to the recording mechanism, a combined actuating and setting device common to said positioned record tape mechanism and the recording mechanism for setting them to record the time of entry, a combined actuating and setting device common to said positioned record tape mechanism and the recording mechanism for setting them to record the time of departure, a controlling cam common to said devices, a clock mechanism for revolving said cam, said cam formed with concentric surfaces common to said devices to provide for a corresponding record of the time of entry or departure on the selectively positioned record tape mechanisms, and means for bodily shifting said cam to position said surfaces in cooperative relation with respect to said devices.

10. An apparatus for the purpose set forth comprising a record tape mechanism including a record tape provided with means for computing and indicating the number of hours of employment of an employee, said mechanism further provided with means for shifting said tape in one direction on the entry and in the opposite direction on the departure of an employee to position the tape to receive the record of the time of entry or departure at points in cooperative relation with respect to said computing and indicating means.

11. An apparatus for the purpose set forth comprising a record tape mechanism including a record tape provided with means for computing and indicating the aggregate number of hours of employment of an employee and for computing and indicating the aggregate amount of compensation due the employee for the aggregate number of hours employed, said mechanism further including means for shifting said tape in one direction at the entry and in the opposite direction at the departure of an employee to position the tape to receive the record of the time of entry or departure at points in cooperative relation with respect to said indicating means.

12. An apparatus for the purpose set forth comprising a record tape mechanism including a record tape provided with means for computing and indicating the number of hours of employment of an employee, said mechanism further provided with means for shifting said tape in one direction on the entry and in the opposite direction on the departure of an employee to position the tape to receive the record of the time of entry or departure at points in cooperative relation with respect to said computing and indicating means, a recording mechanism, means for positioning said record tape mechanism in cooperative relation with respect to said recording mechanism, and means common to said positioned record tape mechanism and the recording mechanism for setting them to record the time of entry or departure on the shifted tape.

13. An apparatus for the purpose set forth comprising a recording tape mechanism including a record tape provided with means for computing and indicating the aggregate number of hours of employment of an employee and for computing and indicating the aggregate amount of compensation due the employee for the aggregate number of hours employed, said mechanism further including means for shifting said tape in one direction at the entry and in the opposite direction at the departure of an employee to position the tape to receive the record of the time of entry or departure at points in cooperative relation with respect to said indicating means, a recording mechanism, means for positioning said record tape mechanism in cooperative relation with respect to said recording mechanism, and means common to said positioned record tape mechanism and the recording mechanism for setting them to record the time of entry or departure on the shifted tape.

14. An apparatus for the purpose set forth comprising a record tape mechanism including a record tape provided with means for computing and indicating the number of hours of employment of an employee, said mechanism further provided with means for shifting said tape in one direction on the entry and in the opposite direction on the departure of an employee to position the tape to receive the record of the time of entry or departure at points in cooperative relation with respect to said computing and indicating means, a recording mechanism, means for positioning said record tape mechanism in cooperative relation with respect to said recording mechanism, means common to said positioned record tape mechanism and the recording mechanism for setting them to record the time of entry or departure on the shifted tape, a controlling cam for said setting means, and a clock mechanism for revolving said cam.

15. An apparatus for the purpose set forth comprising a recording tape mechanism including a record tape provided with means for computing and indicating the aggregate number of hours of employment of an employee and for computing and indicating the aggregate amount of compensation due the employee for the aggregate number of hours employed, said mechanism further including means for shifting said tape in one direction at the entry and in the opposite direction at the departure of an employee to position the tape to receive the record of the time of entry or departure at points in cooperative relation with respect to said indicating means, a recording mechanism, means for positioning said record tape mechanism in cooperative relation with respect to said recording mechanism, means common to said positioned record tape mechanism and the recording mechanism for setting them to record the time of entry or departure on the shifted tape, a controlling cam for said setting means, and a clock mechanism for revolving said cam.

16. An apparatus for the purpose set forth comprising a record tape mechanism including a record tape provided with means for computing and indicating the number of hours of employment of an employee, said mechanism further provided with means for shifting said tape in one direction on the entry and in the opposite direction on the departure of an employee to position the tape to receive the record of the time of entry or departure at points in cooperative relation with respect to said computing and indicating means, a recording mechanism, means for positioning said record tape mechanism in cooperative relation with respect to the recording mechanism, and a pair of combined actuating and setting devices common to said mechanisms for setting them to record the time of entry or departure on the shifted tape.

17. An apparatus for the purpose set forth comprising a record tape mechanism including a record tape provided with means for computing and indicating the aggregate number of hours of employment of an employee and for computing and indicating the aggregate amount of compensation due the employee for the aggregate number of hours employed, said mechanism further including means for shifting said tape in one direction at the entry and in the opposite direction at the departure of an employee to position the tape to receive the record of the time of entry or departure at points in cooperative relation with respect to said indicating means, a recording mechanism, means for positioning said record tape mechanism in cooperative relation with respect to the recording mechanism, and a pair of combined actuating and setting devices common to said mechanisms for setting them to record the time of entry or departure on the shifted tape.

18. An apparatus for the purpose set forth comprising a record tape mechanism including a record tape provided with means for computing and indicating the number of hours of employment of an employee, said mechanism further provided with means for shifting said tape in one direction on the entry and in the opposite direction on the departure of an employee to position the tape to receive the record of the time of entry or departure at points in cooperative relation with respect to said computing and indicating means, a recording mechanism, means for positioning said record tape mechanism in cooperative relation with respect to the recording mechanism, a pair of combined actuating and setting devices common to said mechanisms for setting them to record the time of entry or departure on the shifted tape, a controlling cam common to said devices, and a clock mechanism for revolving said cam.

19. An apparatus for the purpose set forth comprising a record tape mechanism including a record tape provided with means for computing and indicating the aggregate number of hours of employment of an employee and for computing and indicating the aggregate amount of compensation due the employee for the aggregate number of hours employed, said mechanism further including means for shifting said tape in one direction at the entry and in the opposite direction at the departure of an employee to position the tape to receive the record of the time of entry or departure at points in cooperative relation with respect to said indicating means, a recording mechanism, means for positioning said record tape mechanism in cooperative relation with respect to the recording mechanism, a pair of combined actuating and setting devices common to said mechanisms for setting them to record the time of entry or departure on the shifted tape, a controlling cam common to said devices, and a clock mechanism for revolving said cam.

20. An apparatus for the purpose set forth comprising a revolvable carrier, a plurality of independent record tape mechanisms connected to said carrier and equally spaced with respect to each other, a recording mechanism common to said record tape mechanisms, means connected to the carrier for selectively positioning said record tape mechanisms in cooperative relation with respect to the recording mechanism, means to provide for the retaining of said carrier in position to hold a record tape mechanism in the position to which it has been shifted, and means common to said positioned record tape mechanism and the recording mechanism for setting the said mechanisms to record the time of entry or departure on the record tape mechanism.

21. An apparatus for the purpose set forth comprising a revolvable carrier, a plurality of independent record tape mechanisms connected to said carrier and equally spaced with respect to each other, a recording mechanism common to said record tape mechanisms, means connected to the carrier for selectively positioning said record tape mechanisms in cooperative relation with respect to the recording mechanism, means to provide for the retaining of said carrier in position to hold a record tape mechanism in the position to which it has been shifted, means common to said positioned record tape mechanism and the recording mechanism for setting the said mechanisms to record the time of entry or departure on the record tape mechanism, a controlling cam for said setting means, and a clock mechanism for revolving said cam.

22. An apparatus for the purpose set forth comprising a revolvable carrier, a plurality of independent record tape mechanisms connected to said carrier and equally spaced with respect to each other, a recording mechanism common to said record tape mechanisms, means connected to the carrier for selectively positioning said record tape mechanisms in cooperative relation with respect to the recording mechanism, means to provide for the retaining of said carrier in position to hold a record tape mechanism in the position to which it has been shifted, means common to said positioned record tape mechanism and the recording mechanism for setting the said mechanisms to record the time of entry or departure on the record tape mechanism, a controlling cam for said setting means, and a clock mechanism for revolving said cam, said cam formed with concentric surfaces to provide for a corresponding record of the time of entry or departure on the selectively positioned record tape mechanisms.

23. An apparatus for the purpose set forth comprising a revolvable carrier, a plurality of independent record tape mechanisms connected to said carrier and equally spaced with respect to each other, a recording mechanism common to said record tape mechanisms, means connected to the carrier for selectively positioning said record tape mechanisms in cooperative relation with respect to the recording mechanism, means to provide for the retaining of said carrier in position to hold a record tape mechanism in the position to which it has been shifted, means common to said positioned record tape mechanism and the recording mechanism for setting the said mechanisms to record the time of entry or departure on the record tape mechanism, a controlling cam for said setting means, a clock mechanism for revolving said cam, said cam formed with concentric surfaces to provide for a corresponding record of the time of entry or departure on the selectively positioned record tape mechanisms, and means for bodily shifting said cam to arrange said concentric surfaces in cooperative relation with respect to said means.

24. An apparatus for the purpose set forth comprising a plurality of independent record tape mechanisms, a resiliently supported recording mechanism common to said record tape mechanisms, means for selectively positioning said record tape mechanisms in cooperative relation with respect to the recording mechanism, means common to said positioned record tape mechanism and the recording mechanism for setting them in cooperative relation to record the time of entry or departure on the record tape mechanisms, and means for shifting said recording mechanism to provide the record tape mechanism with the record of the time of entry or departure.

25. An apparatus for the purpose set forth comprising a plurality of independent record tape mechanisms, a resiliently supported recording mechanism common to said record tape mechanisms, means for selectively positioning said record tape mechanisms in cooperative relation with respect to the recording mechanism, means common to said positioned record tape mechanism and the recording mechanism for setting them in cooperative relation to record the time of entry or departure on the record tape mechanisms, means for shifting said recording mechanism to provide the record tape mechanism with the record of the time of entry or departure, a controlling cam for said setting means, and a clock mechanism for revolving said cam.

26. An apparatus for the purpose set forth comprising a plurality of independent record tape mechanisms, a resiliently supported recording mechanism common to said record tape mechanisms, means for selectively positioning said record tape mechanisms in cooperative relation with respect to the recording mechanism, means common to said positioned record tape mechanism and the recording mechanism for setting them in cooperative relation to record the time of entry or departure on the record tape mechanisms, means for shifting said recording mechanism to provide the record tape mechanism with the record of the time of entry or departure, a controlling cam for said setting means, and a clock mechanism for revolving said cam, said cam formed with concentric surfaces to provide for a corresponding record of the time of entry or departure on the selectively positioned record tape mechanisms.

27. An apparatus for the purpose set forth comprising a plurality of independent record tape mechanisms, a resiliently supported recording mechanism common to said record tape mechanisms, means for selectively positioning said record tape mechanisms in cooperative relation with respect to the recording mechanism, means common to said positioned record tape mechanism and the recording mechanism for setting them in cooperative relation to record the time of entry or departure on the record tape mechanisms, means for shifting said recording mechanism to provide the record tape mechanism with the record of the time of entry or departure, a controlling cam for said setting means, a clock mechanism for revolving said cam, said cam formed with concentric surfaces to provide for a corresponding record of the time of entry or departure on the selectively positioned record tape mechanisms, and means for bodily shifting said cam to position said concentric surfaces in cooperative relation with respect to said setting means.

28. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism and the recording mechanism for setting them to record the time of entry or departure, means for operating said recording mechanism after a record tape mechanism has been selectively positioned in cooperative relation with respect to said recording mechanism, and means for releasably maintaining the record tape mechanisms in their selective positions.

29. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism and the recording mechanism for setting them to record the time of entry or departure, means for operating said recording mechanism after a record tape mechanism has been selectively positioned in cooperative relation with respect to said recording mechanism, means for releasably maintaining the record tape mechanisms in their selective positions, a controlling cam for said setting means, and a clock mechanism for revolving said cam.

30. An apparatus for the purpose set forth comprising a plurality of independent record tape mechanisms, a recording mechanism common to said record tape mechanisms, means for selectively positioning said record tape mechanism in cooperative relation with respect to the recording mechanism, means common to said positioned record tape mechanism to provide for the setting of said mechanisms to record the time of entry or departure, each record tape mechanism including record tape shiftable in alternate directions, and means to prevent the shifting of the record tape successively in the same direction.

31. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism to provide for the setting of said mechanisms to record the time of entry or departure, a controlling cam for said setting means, a clock mechanism for revolving said cam, each record tape mechanism including record tape shiftable in alternate directions, and means to prevent the shifting of the record tape successively in the same direction.

32. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism to provide for the setting of said mechanisms to record the time of entry or departure, said means provided with a retaining element for maintaining the record tape mechanism in position to which it has been shifted, each record tape mechanism including record tape shiftable in alternate directions, and means to prevent the shifting of the record tape successively in the same direction.

33. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism to provide for the setting of said mechanisms to record the time of entry or departure, a controlling cam for said setting means, a clock mechanism for revolving said cam, said means provided with a retaining element for maintaining the record tape mechanism in position to which it has been shifted, each record tape mechanism including record tape shiftable in alternate directions, and means to prevent the shifting of the record tape successively in the same direction.

34. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism to provide for the setting of said mechanisms to record the time of entry or departure, a controlling cam for said setting means, a clock mechanism for revolving said cam, said cam formed with concentric surfaces coacting with said means to provide for a corresponding record of the time of entry or departure on the selectively positioned record tape mechanisms, said means provided with a retaining element for maintaining the record tape mechanism in the position to which it has been shifted, each record tape mechanism including record tape shiftable in alternate directions, and means to prevent the shifting of the record tape successively in the same direction.

35. An apparatus for the purpose set forth comprising a record tape mechanism including a record tape provided with means for computing and indicating the number of hours of employment of an employee, said mechanism further provided with means for shifting said tape in one direction on the entry and in the opposite direction on the departure of an employee to position the tape to receive the record of the time of entry or departure at points in cooperative relation with respect to said computing and indicating means, and means to prevent the shifting of said tape successively in the same direction.

36. An apparatus for the purpose set forth comprising a record tape mechanism including a record tape provided with means for computing and indicating the aggregate number of hours of employment of an employee and for computing and indicating the aggregate amount of compensation due the employee for the aggregate number of hours employed, said mechanism further including means for shifting said tape in one direction at the entry and in the opposite direction at the departure of an employee to position the tape to receive the record of the time of entry or departure at points in cooperative relation with respect to said indicating means, and means to prevent the shifting of said tape successively in the same direction.

37. An apparatus for the purpose set forth comprising a record tape mechanism including a record tape provided with means for computing and indicating the number of hours of employment of an employee, said mechanism further provided with means for shifting said tape in one direction on the entry and in the opposite direction on the departure of an employee to position the tape to receive the record of the time of entry or departure at points in cooperative relation with respect to said computing and indicating means, a recording mechanism, means for positioning said record tape mechanism in cooperative relation with respect to said recording mechanism, means common to said positioned record tape mechanism and the recording mechanism for setting them to record the time of entry or departure on the shifted tape, and means to prevent the shifting of said tape successively in the same direction.

38. An apparatus for the purpose set forth comprising a recording tape mechanism including a record tape provided with means for computing and indicating the aggregate number of hours of employment of an employee and for computing and indicating the aggregate amount of compensation due the employee for the aggregate number of hours employed, said mechanism further including means for shifting said tape in one direction at the entry and in the opposite direction at the departure of an employee to position the tape to receive the record of the time of entry or departure at points in cooperative relation with respect to said indicating means, a recording mechanism, means for positioning said record tape mechanism in cooperative relation with respect to said recording mechanism, means common to said positioned record tape mechanism and the recording mechanism for setting them to record the time of entry or departure on the shifted tape, and means to prevent the shifting of said tape successively in the same direction.

39. An apparatus for the purpose set forth comprising a record tape mechanism including a record tape provided with means for computing and indicating the number of hours of employment of an employee, said mechanism further provided with means for shifting said tape in one direction on the entry and in the opposite direction on the departure of an employee to position the tape to receive the record of the time of entry or departure at points in cooperative relation with respect to said computing and indicating means, a recording mechanism, means for positioning said record tape mechanism in cooperative relation with respect to said recording mechanism, means common to said positioned record tape mechanism and the recording mechanism for setting them to record the time of entry or departure on the shifted tape, a controlling cam for said setting means, a clock mechanism for revolving said cam, and means to prevent the shifting of said tape successively in the same direction.

40. An apparatus for the purpose set forth comprising a recording tape mechanism including a record tape provided with means for computing and indicating the aggregate number of hours of employment of an employee and for computing and indicating the aggregate amount of compensation due the employee for the aggregate number of hours employed, said mechanism further including means for shifting said tape in one direction at the entry and in the opposite direction at the departure of an employee to position the tape to receive the record of the time of entry or departure at points in cooperative relation with respect to said indicating means, a recording mechanism, means for positioning said record tape mechanism in cooperative relation with respect to said recording mechanism, means common to said positioned record tape mechanism and the recording mechanism for setting them to record the time of entry or departure on the shifted tape, a controlling cam for said setting means, a clock mechanism for revolving said cam, and means to prevent the shifting of said tape successively in the same direction.

41. An apparatus for the purpose set forth comprising a record tape mechanism including a record tape provided with means for computing and indicating the number of hours of employment of an employee, said mechanism further provided with means for shifting said tape in one direction on the entry and in the opposite direction on the departure of an employee to position the tape to receive the record of the time of entry or departure at points in cooperative relation with respect to said computing and indicating means, a recording mechanism, means for positioning said record tape mechanism in cooperative relation with respect to the recording mechanism, a pair of combined actuating and setting devices common to said mechanisms for setting them to record the time of entry or departure on the shifted tape, and means to prevent the shifting of said tape successively in the same direction.

42. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism to provide for the setting of said mechanisms to record the time of entry or departure, said setting means including controlling elements to compel a continuous complete operation or stroke from normal to setting and recording position and from recording position to normal.

43. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism to provide for the setting of said mechanisms to record the time of entry or departure, a controlling cam for said setting means, and a clock mechanism for revolving said cam, said setting means including controlling elements to compel a continuous complete operation or stroke from normal to setting and recording position and from recording position to normal.

44. An apparatus for the purpose set forth comprising a plurality of independent record tape mechanisms, a recording mechanism common to said record tape mechanisms, means for selectively positioning said record tape mechanisms in cooperative relation with respect to the recording mechanism, means common to said positioned record tape mechanism to provide for the setting of said mechanisms to record the time of entry or departure, a controlling cam for said setting means, and a clock mechanism for revolving said cam, said cam formed with concentric surfaces coacting with said means to provide for a corresponding record of the time of entry or departure on the selectively positioned record tape mechanisms, said setting means including controlling elements to compel a continuous complete operation or stroke from normal to setting and recording position and from recording position to normal.

45. An apparatus for the purpose set forth comprising a plurality of independent record tape mechanisms, a recording mechanism common to said record tape mechanisms, means for selectively positioning said record tape mechanisms in cooperative relation with respect to the recording mechanism, and means common to said positioned record tape mechanism to provide for the setting of said mechanisms to record the time of entry or departure, and said means provided with a retaining element for maintaining the record tape mechanism in the position to which it has been shifted, said setting means including controlling elements to compel a continuous complete operation or stroke from normal to setting and recording position and from recording position to normal.

46. An apparatus for the purpose set forth comprising a plurality of independent record tape mechanisms, a recording mechanism common to said record tape mechanisms, means for selectively positioning said record tape mechanisms in coopeartive relation with respect to the recording mechanism, means common to said positioned record tape mechanism to provide for the setting of said mechanisms to record the time of entry or departure, a controlling cam for said setting means, a clock mechanism for revolving said cam, and said means provided with a retaining element for maintaining the record tape mechanism in the position to which it has been shifted, said setting means including controlling elements to compel a continuous complete operation or stroke from normal to setting and recording position and from recording position to normal.

47. An apparatus for the purpose set forth comprising a pluarlity of independent record tape mechanisms, a recording mechanism common to said record tape mechanisms, means for selectively positioning said record tape mechanisms in cooperative relation with respect to the recording mechanism, a combined actuating and setting device common to said positioned record tape mechanism and the recording mechanism for setting them to record the time of entry, a combined actuating and setting device common to said positioned record tape mechanism and the recording mechanism for setting them to and record the time of departure, a controlling cam common to said devices, and a clock mechanism for revolving said cam, said devices including controlling elements to compel a continuous complete operation or stroke from normal to setting and actuating position and from setting and actuating position to normal.

48. An apparatus for the purpose set forth comprising a plurality of independent record tape mechanisms, a recording mechanism common to said record tape mechanism, means for selectively positioning said record tape mechanism in cooperative relation with respect to the recording mechanism, a combined actuating and setting device common to said positioned record tape mechanism and the registering and recording mechanism for setting them to record the time of entry, a combined actuating and setting device common to said positioned record tape mechanism and the recording mechanism for setting them to record the time of departure, a controlling cam common to said devices, and a clock mechanism for revolving said cam, said cam formed with concentric surfaces common to said devices to provide for a corresponding record of the time of entry or departure on the selectively positioned record tape mechanism, said devices including controlling elements to compel a continuous complete operation or stroke from normal to setting and actuating position and from setting and actuating position to normal.

49. An apparatus for the purpose set forth comprising a plurality of independent record tape mechanisms, a recording mechanism common to said record tape mechanisms, means for selectively positioning said record tape mechanisms in cooperative relation with respect to the recording mechanism, a combined actuating and setting device common to said positioned record tape mechanism and the recording mechanism for setting them to record the time of entry, a combined actuating and setting device common to said positioned record tape mechanism and the recording mechanism for setting them to record the time of departure, a controlling cam common to said devices, a clock mechanism for revolving said cam, said cam formed with concentric surfaces common to said devices to provide for a corresponding record of the time of entry or departure on the selectively positioned record tape mechanisms, and means for bodily shifting said cam to position said surfaces in cooperative relation with respect to said devices, said devices including controlling elements to compel a continuous complete operation or stroke from normal to setting and actuating position and from setting and actuating position to normal.

50. An apparatus for the purpose set forth comprising a record tape mechanism including a record tape provided with means for computing and indicating the number of hours of employment of an employee, said mechanism further provided with means for shifting said tape in one direction on the entry and in the opposite direction on the departure of an employee to position the tape to receive the record of the time of entry or departure at points in cooperative relation with respect to said computing and indicating means, a recording mechanism, means for positioning said record tape mechanism in cooperative relation with respect to said recording mechanism, and means common to said positioned record tape mechanism and the recording mechanism for setting them to record the time of entry or departure on the shifted tape, said setting means including controlling elements to compel a continuous complete operation from normal to setting and recording position and from recording position to normal.

51. An apparatus for the purpose set forth comprising a revolvable cam operated from and synchronously with a time mechanism, a recording mechanism, a plurality of independent record tape mechanisms each adapted to be positioned in cooperative relation with respect to said recording mechanism, and setting devices common to the positioned record tape mechanism and said recording mechanism and having the operative movements thereof controlled by said cam.

52. An apparatus for the purpose set forth comprising a revoluble cam operated from and synchronously with a time mechanism, a recording mechanism, a plurality of independent record tape mechanisms each adapted to be positioned in cooperative relation with respect to said recording mechanism, and setting devices common to the positioned record tape mechanism and said recording mechanism and having the operative movements thereof controlled by said cam, said controlling cam arranged below and in the path of travel of said setting devices.

In testimony whereof, I affix my signature hereto.

WILLIAM B. BETTS.